July 19, 1966  C. B. A. WICKENHAGEN  3,262,041
ZERO SPEED SWITCH

Filed May 14, 1962  2 Sheets-Sheet 1

INVENTOR.
CORNELIS B. A. WICKENHAGEN
BY
Flam and Flam
ATTORNEYS.

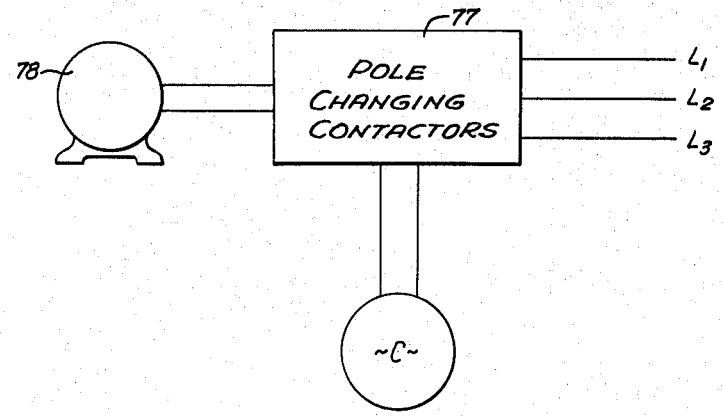
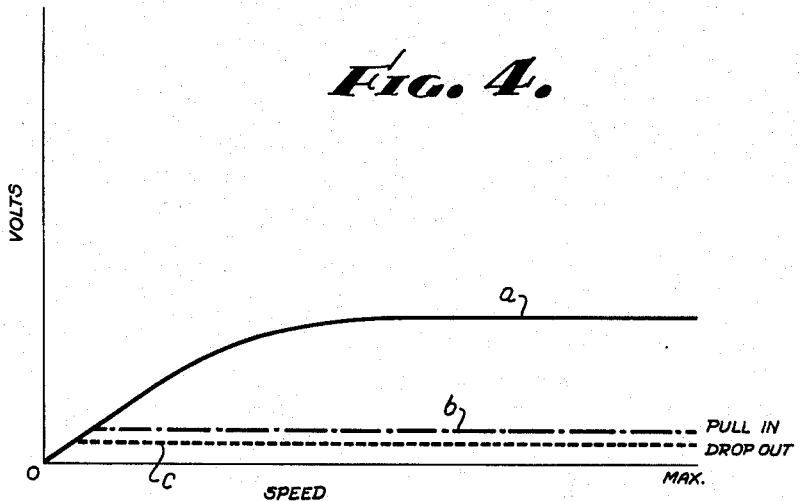

United States Patent Office 3,262,041
Patented July 19, 1966

3,262,041
ZERO SPEED SWITCH
Cornelis B. A. Wickenhagen, Lawndale, Calif., assignor, by mesne assignments, to Emerson Electric Co., a corporation of Missouri
Filed May 14, 1962, Ser. No. 194,262
14 Claims. (Cl. 318—369)

This invention relates to a control circuit, and particularly to a control circuit for use with alternators, or the like, for performing switching functions near the zero speed range.

One of the primary objects of this invention is to provide a simple electronic substitute for a centrifugal action switch, and which performs its functions without inertial delays characteristic of rotating masses.

Another object of this invention is to provide an electronic device that, as a function of alternator output, generates a function, as for example, voltage, that at or near zero frequency, is a linear, whereas beyond the zero range, the function is flat, or constant. Various components, such as voltage sensitive relays, semiconductors, etc., can be directly used without complicated coupling circuits.

In a variable speed system utilizing a series of slave induction motors and a variable speed alternator for providing power for the motors, it is important to cut off exciter current when alternator speed reduces to zero in order to prevent overheating. An object of this invention is to provide simple circuiting for automatically accomplishing this function.

Another object of this invention is to provide a simple system for switching windings of a motor for high speed or low speed operation and at a selected critical speed.

Still another object of this invention is to provide a system for plugging or otherwise controlling a motor circuit at a preselected speed.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIGS. 2 and 3 are diagrammatic views of other control circuits, one for a reversible motor and one for a motor having winding sections for different speeds; and FIG. 4 is a graph depicting the function generated by the sensing portions of the circuits.

Figure 1:
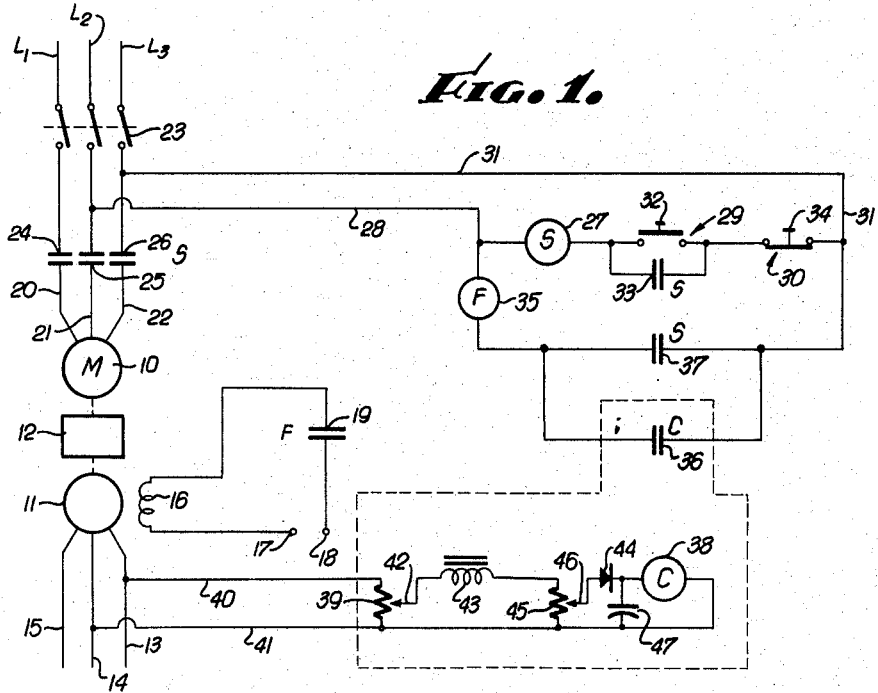
FIGURE 1 is a diagrammatic view of a control circuit for a motor generator set and incorporating the present invention.

In FIG. 1 is illustrated a three phase motor 10 driving an alternator 11 as by a variable speed transmission mechanism 12. The alternator 11 has three phase output leads 13, 14 and 15 for supplying remotely located motors, the speeds of which will vary in unison according to the speed of the alternator 11.

The alternator 11 is shown as having a field winding 16. A direct current source (not shown) may be connected to the field winding 16 by the aid of terminals 17 and 18. One of the terminals 17 connects to one side of the field winding 16 and the other terminal 18 connects to the other side of the field winding 16 but via a normally open relay contact 19, to be described more fully hereinafter.

Supply lines $L_1$, $L_2$ and $L_3$ connect to leads 20, 21 and 22 via a main switch 23 and normally open relay contacts 24, 25 and 26. The relay contacts 24, 25 and 26 are controlled by a starting relay, as indicated by legend S. This starting relay has a coil 27 that derives energization from two of the supply lines $L_2$ and $L_3$. The circuit for the relay coil 27 can be traced as follows, and assuming the main switch 23 is closed:

Supply line $L_2$, lead 28, relay coil 27, a normally open start switch 29, normally closed stop switch 30, lead 31 and the supply line $L_3$.

When the arm or button 32 of the start switch 29 is depressed, a circuit is established for the relay coil 27, the relay contacts 24, 25 and 26 close and a circuit for the motor 10 is established. At the same instant, the starting switch 29 is paralled by a fourth set of normally open contacts 33 of the starting relay. Accordingly the energization for the motor 10 continues until such time as the stop button or arm 34 of the stop switch 30 is depressed. When the button 34 is so depressed, the circuit for the relay coil via holding contact 33 is interrupted.

Simultaneously with the supply of energy to the motor 10, the circuit for the field winding 16 is completed. For this purpose a field relay is provided that has a coil 35 controlled by the starting relay. The field relay 35 operates the normally open contacts 19, as indicated by legend F.

A circuit for the coil 35 of the field relay parallels the start and stop switches and starting relay coil 27. It can be traced as follows: Lead 28, relay coil 35, a fifth set of normally open contacts 37 of the starting relay to lead 31 and the other supply line L3.

When the circuit for the motor 10 is interrupted, it is desirable to maintain the energization of the field winding 16. Thus all of the motors deriving energy from the leads 13, 14 and 15 will then slow down together under the influence of the decreasing frequency output of the alternator 11. In order to maintain the relay coil 35 energized until the last moment, normally open contacts 36 are provided that parallel the starting relay contacts 37. The contacts 36 are closed and remain closed until the speed of the generator 11 very closely approaches zero. Accordingly, despite deenergization of the start relay coil 27 by operation of the button 34, the relay coil 35 is yet operative, the contacts 19 are closed and current is passed to the field 16.

For controlling the contacts 36, a speed sensing control relay is provided that has a coil 38. In the present example, the speed sensing relay is of the direct current type in which the voltage must reach a predetermined critical value for pull-in and a predetermined critical value for dropout. The relay coil 38 senses and derives power from alternator 11, as at two of its leads 13 and 14. A potentiometer resistor 39 is connected across the alternator leads 13 and 14 by leads 40 and 41. Connected across a section of the potentiometer resistor 39, as determined by the position of the tap 42, are an inductor 43 and a resistor 45. The resistor forms a part of a potentiometer. A slider 46 serves as a means for connecting the relay coil 38 across a selected portion of the resistor 45. A rectifying diode 44 is interposed between the slider 46 and coil 38. A pulse smoothing condenser 47 parallels the relay coil 38.

The voltage at the tap 46 is given approximately by the equation $$K_0 VR/\sqrt{(2\pi fL)^2 + R^2}$$

in which V is the voltage at the contact 42, R is the value of the resistor 45, $K_0$ is a constant determined by the position of the slider 46, and L is the value of the inductance of the coil 43. The voltage V at the contact 42 in turn is directly proportional to the speed or frequency of operation of the alternator 11. Accordingly, by substitution, the voltage at the tap 46 is given approximately by the equation $$Kfr/\sqrt{(2\pi fL)^2+R^2}$$

in which $f$ is the frequency of the alternator 11 and in which K is a constant determined by the setting of both sliders 42 and 46.

When the frequency is very high the reactance $2\pi fL$ due to the inductance 43 is likewise high compared to R. Hence $R^2$ can be ignored at high frequencies. Accordingly, the above equation discloses that at high frequencies the voltage applied to the relay coil 38 is given by the equation $$\frac{KR}{2\pi L}$$

In other words, the voltage is independent of frequency and approaches a constant value.

When the frequency is low, then the value of $(2\pi fL)^2$ in comparison with $R^2$ can be ignored and the voltage is given by the equation $Kf/R$. In other words, the voltage at slider 46 is a linear function of frequency. The voltage function generated by the circuit elements on 39, 43, 44 and 45 is graphically depicted in FIG. 4 at the curve $a$.

When the motor generator set is started the voltage sensitive relay coil 38 pulls in at a value illustrated at $b$. This has no effect on the system since contacts 37 have previously closed. However, when the starting relay coil 27 is deenergized, then the contacts 36 remain closed. The voltage supplied to the relay coil 38 falls along the curve $a$ until a value illustrated at $c$ corresponding to drop-out is reached. Realy contacts 36 open thereby causing delayed opening of the relay contacts 19.

The value of drop-out as illustrated at $c$ may be very close to zero by use of a sensitive relay and adjustment of potentiometer taps 42 and 46. Yet the circuit prevents a destructive voltage from being applied to the relay coil 38 when the speed is high.

Figure 2:
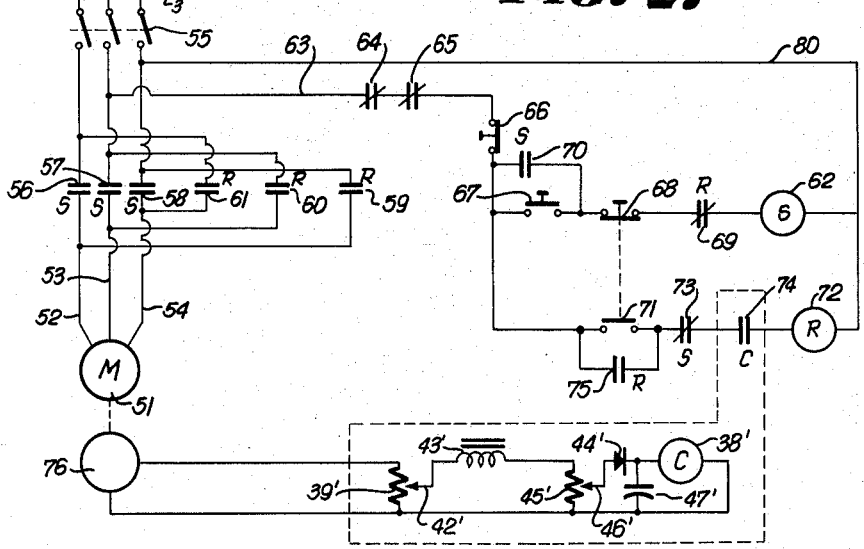

In the circuit shown in FIG. 2, a motor 51 is shown as having three leads, 52, 53 and 54 cooperable with source lines $L_1$, $L_2$ and $L_3$ via main switch 55.

Cooperable with the leads 52, 53 and 54 are two sets of contacts. The contacts 56, 57 and 58 connect the motor leads 52, 53 and 54 to the power lines $L_1$, $L_2$ and $L_3$ respectively for normal rotation of the motor 51 in one direction. Contacts 59, 60 and 61 connect the leads 52, 53 and 54 to lines $L_3$, $L_2$ and $L_1$ respectively for producing a torque in the opposite direction. Thus by operation of the contact set 59, 60 and 61, it is possible to plug the motor 51 to bring it quickly to a stop.

In this example the control circuit includes a starting relay denoted by legend S having a coil 62 energized by two of the lines $L_2$ and $L_3$. The circuit for the starting relay 62 can be traced as follows: a lead 63 from one of the lines $L_2$ through overload protective devices 64 and 65, a normally closed stop switch 66, a normally open start switch 67, a normally closed plug stop switch 68, normally closed interlock contacts 69 operatively associated with a plugging relay to be hereinafter described, and the coil 62, lead 80, to the line $L_3$. When the start switch 67 is closed, the coil 62 of the starting relay is energized. Energization is maintained by normally open holding contacts 70 paralleling the starting switch 67. Accordingly, the power contacts 56, 57 and 58 close and the motor 51 is operated in its normal direction of rotation.

In order to stop the motor 51 in a normal manner, it is merely necessary to open the stop switch 66. The holding circuit via contacts 70 is interrupted, the contacts 56, 57 and 58 open and the motor coasts to a stop. However, if it is desired more quickly to stop the motor, the plug stop switch 68 is operated.

The switch 68 first of all interrupts the holding circuit for starting relay coil 62 and the power contacts 56, 57 and 58 open. A normally open switch 71 is coupled to the actuator for plug stop switch 68. The switch 71 completes a circuit for a plugging relay, denoted by legend R, the coil 72 of which has the energization circuit traceable as follows: line $L_2$, lead 63, overload protective devices 64 and 65, stop switch 66, normally open plug stop switch 71, normally closed interlocking relay contacts 73 associated with the start relay, normally open speed controlled contacts 74, and plugging relay coil 72 to the lead 80 and line $L_3$.

When the plug stop switch 68 and 71 is operated the starting relay coil 62 is deenergized. This closes interlock contacts 73 and the relay coil 72 can now be energized if the speed is adequate to close the speed control contacts 74. Energization of plugging relay coil 72 causes the contacts 59, 60 and 61 to close, thereby reverse the energizing the motor 51. Normally open holding contacts 75 parallel the normally open switch 71 so that the plug stop switch need be only momentarily depressed.

The interlock contacts 69 and 73 prevent the two sets of relay contacts 56, 57 and 58 and 59, 60 and 61 from closing at the same time, due to inadvertent operation of start switch 67 during plugging operation, or due to inertia in the starting relay.

As soon as the plugging of the motor 51 reduces the speed of the motor 51 to near zero, then the speed sensing contacts 74 open, and the plugging relay opens, preventing reversal of motor rotation. This is accomplished by a relay coil 38′ and associated circuit elements 47′, 45′, 44′, 43′, 42′, and 39′, equivalent respectively to the circuit elements 38, 47, 45, 44, 43, 42, and 39 of the form disclosed in FIG. 1. In the present example, however, the voltage sensed by the circuit is derived from a small alternator or tachometer generator 76 coupled to the motor 51.

In the form illustrated in FIG. 3, the speed sensing relay C responds to the speed of motor 78 and controls a pole changing device 77 as indicated by block diagram, that changes the number of poles of the primary winding by a factor of two. Accordingly, the windings of the motor 78 can be switched at preselected speeds. The relay C has an operating circuit as in the previous forms.

The inventor claims:

1. In combination: rotary means for producing an alternating electromotive force, the amplitude and frequency of which are direct functions of the speed of the rotary means; an inductive reactor; a resistor; means serially connecting the reactor and the resistor relative to said electromotive force producing means so that the voltage across said resistor is substantially a direct linear function of speed at low speed and substantially a constant at high speed; and switching means operated by at least a portion of the voltage across said resistor for controlling said rotary means.

2. In combination: rotary means for producing an alternating electromotive force, the amplitude and frequency of which are direct functions of the speed of the rotary means; an inductive reactor; a resistor; means serially connecting the reactor and the resistor relative to said electromotive force producing means so that the voltage across said resistor is substantially a direct linear function of speed at low speed and substantially a constant at high speed; and voltage sensitive relay operated by at least a portion of the voltage across said resistor for controlling said rotary means.

3. In combination: rotary means for producing an alternating electromotive force, the amplitude and frequency of which are direct functions of the speed of the rotary means; an inductive reactor; a resistor; a unidirectionally conductive device; means serially connecting the reactor, resistor and unidirectionally conductive device relative to said electromotive force producing means so that the voltage across said resistor is substantially a direct linear function of speed at low speed and substantially a constant at high speed; and a voltage sensitive direct current relay operated by at least a portion of the voltage across said resistor for controlling said rotary means.

4. In combination: rotary means for producing an alternating electromotive force, the amplitude and frequency of which are direct functions of the speed of the rotary means; an inductive reactor; a resistor; means serially connecting the reactor and the resistor relative to said electromotive force producing means so that the voltage across said resistor is substantially a direct linear function of speed at low speed and substantially a constant at high speed; and switching means operated by an adjustable portion of the voltage across said resistor for controlling said rotary means.

5. In combination: rotary means for producing an alternating electromotive force, the amplitude and frequency of which are direct functions of the speed of the rotary means; an inductive reactor; a resistor; means serially connecting the reactor and the resistor relative to said electromotive force producing means so that the voltage across said resistor is substantially a direct linear function of speed at low speed and substantially a constant at high speed; switching means operated by at least a portion of the voltage across said resistor for controlling said rotary means; and means for proportionately altering the voltage applied to said switching means for determining the critical speed at which said switching means operates.

6. In combination: a reversible motor; means operated by the motor for producing an alternating electromotive force, the amplitude and frequency of which are direct functions of the speed of the motor; an inductive reactor; a resistor; means serially connecting the reactor and the resistor relative to said electromotive force producing means so that the voltage across said resistor is substantially a direct linear function of speed at low frequencies and substantially a constant at high speed; and switching means operated by at least a portion of the voltage across said resistor for plugging the motor when the voltage drops below a predetermined value.

7. In a control circuit for a reversible motor: a starting relay having a first set of relay contacts for energizing the motor for a normal direction of rotation; a plugging relay having a second set of relay contacts for reverse energization of the motor; an energization circuit for the starting relay including, in series, a normally open manually operable start switch, a normally closed manually operable plug stop switch, and normally closed interlock contacts operated by the plugging relay; holding contacts operated by the starting relay for paralleling said first start switch; an energization circuit for the plugging relay including, in series, a normally open manually operable plug stop switch operatively associated with said normally closed manually operable plug stop switch, normally closed interlock contacts operated by the starting relay, and normally open speed sensing contacts; holding contacts for paralleling said normally open plug stop switch; a control relay for said speed sensing contacts; means operated by said motor for producing an alternating electromotive force, the amplitude and frequency of which are functions of the speed of the machine; a series circuit including a resistor and an inductive reactor connected across said electromotive force producing means so that the voltage across said resistor is substantially a linear function of speed at low speed and substantially constant at high speed; and means connecting said control relay across at least a portion of said resistor for opening said speed sensing contacts and interrupting the circuit for said plugging relay when the motor speed approaches zero.

8. In a control circuit for a reversible motor: a starting relay having a first set of relay contacts for energizing the motor for a normal direction of rotation; a plugging relay having a second set of relay contacts for reverse energization of the motor; an energization circuit for the starting relay including, in series, a normally open manually operable start switch, a normally closed manually operable plug stop switch, and normally closed interlock contacts operated by the plugging relay; holding contacts operated by the starting relay for paralleling said start switch; an energization circuit for the plugging relay including, in series, a normally open manually operable plug stop switch operatively associated with said normally closed manually operable plug stop switch, normally closed interlock contacts operated by the starting relay, and normally open speed sensing contacts; holding contacts for paralleling said normally open plug stop switch; a normally closed stop switch serially associated with the energization circuits of both the starting relay and the plugging relay; a control relay for said speed sensing contacts; means operated by said motor for producing an alternating electromotive force, the amplitude and frequency of which are functions of the speed of the machine; a series circuit including a resistor and an inductive reactor connected across said electromotive force producing means so that the voltage across said resistor is substantially a linear function of speed at low speed and substantially constant at high speed; and means connecting said control relay across at least a portion of said resistor for opening said speed sensing contacts and interrupting the circuit for said plugging relay when the motor speed approaches zero.

9. A zero speed switch cooperable with control circuitry for rotating machinery having means for producing an alternating electromotive force, the amplitude and frequency of which are direct functions of the speed of the rotating machinery: an inductive reactor; a resistor; means serially connecting the reactor and the resistor relative to said electromotive force producing means so that the voltage across said resistor is substantially a direct linear function of speed at low speed and substantially a constant at high speed; and switching means operated by at least a portion of the voltage across said resistor.

10. The combination as set forth in claim 9 in which said switching means comprises a voltage sensitive relay.

11. The combination as set forth in claim 10 together with adjustable means for applying to said switching means, a selected portion of the voltage across said resistor.

12. A circuit for sensing frequency of an alternating current source, comprising: an inductive reactor; a resistor; means serially connecting the reactor and the resistor relative to said source so that the voltage across said resistor is substantially a direct linear function of frequency at low frequency, and substantially a constant at high frequency; and operating means driven by at least a portion of the voltage across said resistor.

13. The combination as set forth in claim 12 in which said operating means comprises a voltage sensitive relay.

14. The combination as set forth in claim 13 together with adjustable means for selecting the portion of voltage applied to said operating means.

References Cited by the Examiner

UNITED STATES PATENTS

| | | | |
|---|---|---|---|
| 1,876,548 | 9/1932 | Atherton | 322—29 |
| 1,976,048 | 10/1934 | Tuthill et al. | 318—352 |
| 2,253,253 | 8/1941 | Sohn | 318—352 |
| 2,312,275 | 2/1943 | Ohken et al. | 332—29 |
| 2,581,292 | 1/1952 | Rathburn | 318—369 X |
| 2,589,276 | 3/1952 | Noodleman | 318—352 |
| 2,718,567 | 9/1955 | Elliot et al. | 318—374 |
| 2,872,633 | 2/1959 | Schurr | 318—374 X |
| 2,886,756 | 5/1959 | Schaefer | 318—374 |
| 3,043,927 | 7/1962 | Lockhart et al. | 318—369 X |

ORIS L. RADER, *Primary Examiner.*

LLOYD McCOLLUM, *Examiner.*

R. C. SIMS, A. H. TISCHER, J. C. BERENZWEIG,
*Assistant Examiners.*